Figure 1:
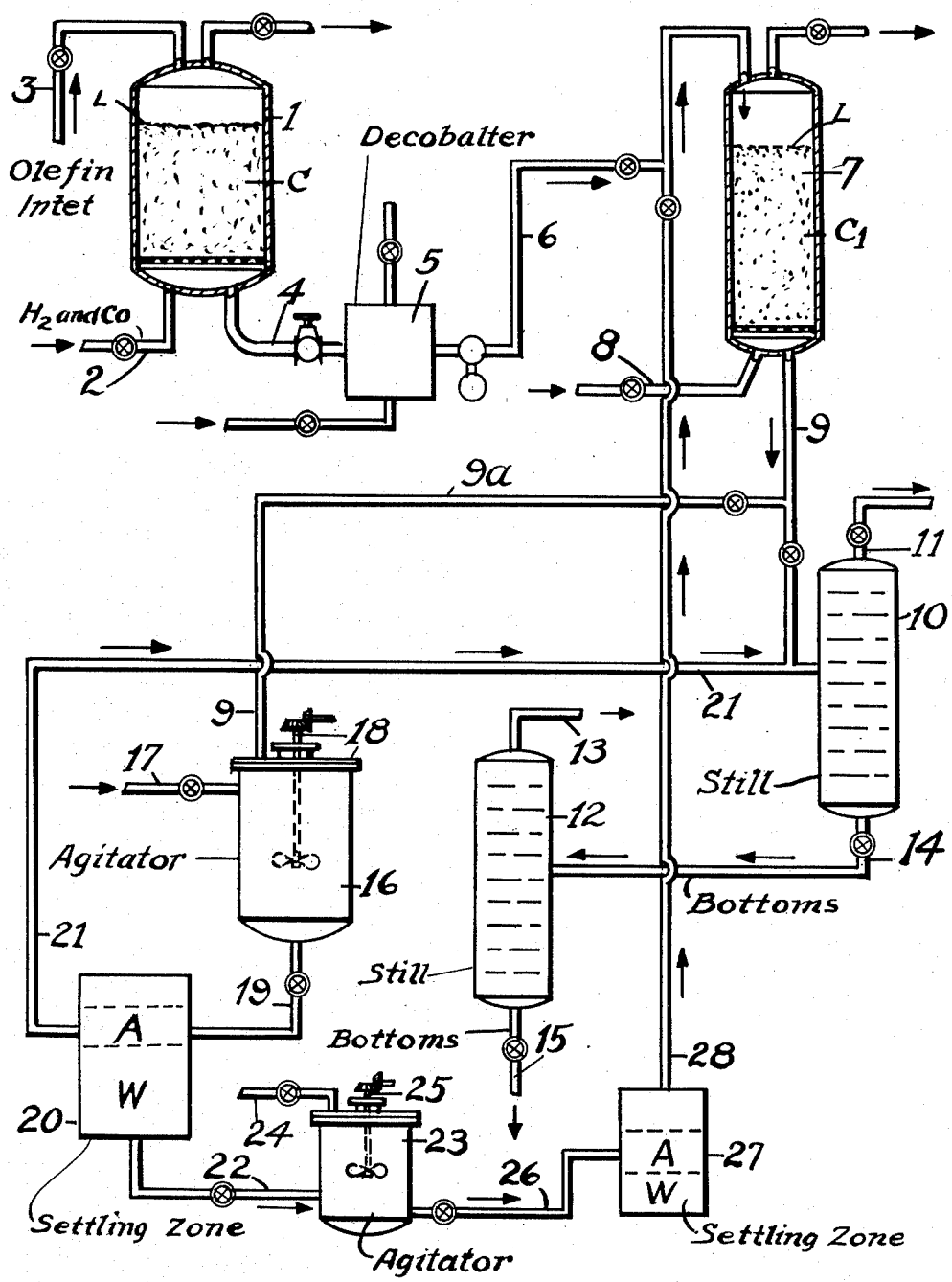
Figure 2:
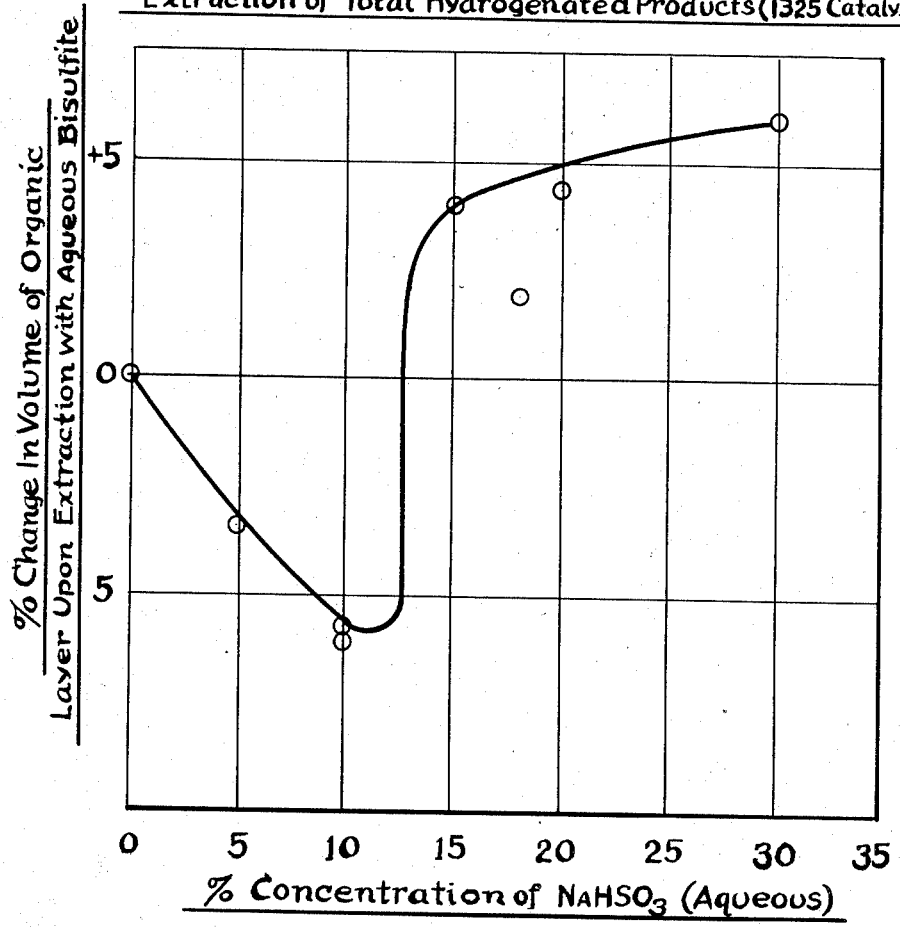

United States Patent Office 2,699,454
Patented Jan. 11, 1955

2,699,454

SYNTHESIS OF OCTYL ALCOHOL

John J. Owen and Joseph K. Mertzweiller, Baton Rouge, La., assignors to Standard Oil Development Company, a corporation of Delaware Application July 17, 1948, Serial No. 39,336

9 Claims. (Cl. 260—638)

The present invention relates to improvements in the "oxo synthesis," a reaction involving carbon monoxide, hydrogen, and an olefin as reactants. The process is catalytic and the usual catalyst is metallic cobalt or a cobalt compound. As is known, the reaction between the foregoing reactants results primarily in the formation of an aldehyde containing one more carbon atom than the olefin. Following the formation of the aldehyde product, the same, in the case where an alcohol is desired, is subjected to a reduction, preferably catalytic, in the presence of an added hydrogen-containing gas.

The object of the invention is to secure a maximum yield of alcohols from the foregoing process through an improved technique which is efficient and economical.

Experience with the process indicated above has shown that in the purification of the alcohol synthesized from the olefin, carbon monoxide and hydrogen, some of the alcohol is lost by side reactions in which formation of high molecular weight compounds results during the distillation of the crude alcohols, or during a redistillation in a finishing still of the alcohols derived from a primary distillation of the alcohol product. Obviously this is undesirable. Another difficulty that has been experienced is that the alcohols obtained from the final distillation, although they may have a satisfactory color which is preferably water white, when esterified, may undergo a color change which is also undesirable. For example, it has been found in the case of an octyl alcohol that this compound, when esterified with phthalic acid or anhydride to form an ester which finds wide use as a plasticizer for resins and other plastics, may undergo an undesirable color change. Since large quantities of dioctyl phthalate are used in plasticizing resins such as the vinyl resins, and, furthermore, since the plasticizer is used in rather large proportions with respect to the resin, often up to 50%, it can readily be seen that, if it is desired to use a plasticized resin having a water white color, or which is adapted to be dyed or pigmented to form light shades, then the plasticizer itself should be substantially colorless.

As indicated, however, it has been found that the alcohol produced as above indicated does not always form an ester of satisfactory color. It has now been found that if the crude alcohol or redistilled alcohol is treated with an aqueous bisulfite solution, such as sodium bisulfite, certain constituents admixed with the alcohol are converted, apparently, into some sort of addition compounds which are soluble in the aqueous medium, and pass into said medium, when the alcohol is treated with the said bisulfite solution. It is important to note that this bisulfite solution should have a concentration fixed within very definite limits for best results. Since, for example, if the solution is too concentrated it serves as a solvent for the desired alcohol product and as a result, alcohol product is lost during the washing with the bisulfite solution, all of which will more fully appear hereinafter.

In the accompanying drawing there is shown diagrammatically, in Fig. I an apparatus layout in which a preferred modification of the present invention may be carried into effect; and in Fig. II, there is shown the effect of the sodium bisulfite solution concentration on residual carbonyl removal from the crude alcohol.

Referring in detail to the drawing the conventional process will first be described and after that, the improved modification; 1 represents a reactor containing a body of catalyst C. This catalyst is preferably some form of cobalt including the metal. A cobalt compound such as a cobalt naphthenate may be used. Ordinarily when a fixed bed of catalyst is used, the cobalt is carried on a support such as silica gel or kieselguhr. However, cobalt soaps which are soluble in the olefin feed may also be used and fed to the reactor in solution. In operating the process, a mixture of carbon monoxide and hydrogen is charged to the reactor from some suitable source through a line 2 and at the same time a liquefied olefin is charged to the reactor through line 3. Within the reactor, and in the presence of the catalyst, and under conditions which are set forth immediately below, a reaction takes place whereby an aldehyde is formed containing one more carbon atom than is contained in the charged olefin. Meanwhile some alcohol is also formed. The conditions giving good results are the following:

| | |
|---|---:|
| Temperature, ° F | 325–375 |
| Pressure, p. s. i. g | 2500–4000 |
| Liquid olefin feed rate, v./v./hr | 0.3–1.0 |
| Volume ratio of hydrogen to carbon monoxide in feed | 0.3–1.5 |
| Gas rate, standard cu. ft./bbl. feed | 2000–10,000 |

The crude aldehyde product is withdrawn from reactor 1 through line 4, the pressure imposed is reduced and the temperature maintained at 300° F., and after passing through a decobalter 5, in which the product is freed from cobalt dissolved therein, is then charged to the second, or hydrogenation stage of the process, in which it is reduced by means of hydrogen in oven 7. The oven or hydrogenator 7 contains a body of catalyst $C_1$ which may be any known hydrogenation catalyst. It has been found, however, preferable to use a sulfide type of catalyst such as a mixture of nickel and tungsten sulfides in which the weight ratio of $NiS/WS_2$ is about 7/1. Hydrogen or hydrogen containing gas is charged to the hydrogenator through line 8. The conditions giving good results in the hydrogenator 7 are as follows:

| | |
|---|---:|
| Temperature, ° F | 400–500 |
| Pressure, p. s. i. g | 2000–3000 |
| Liquid feed rate, v./v./hr | 0.3–1.0 |
| Standard cu. ft. of hydrogen per bbl. crude aldehyde | 4500–10,000 |

Under the conditions stated the charged aldehyde product is reduced to the corresponding alcohol and the product is withdrawn through a line 9 and delivered to a primary distillation zone 10 from which the olefins, $H_2$, CO, etc. are withdrawn overhead through line 11. The bottoms are delivered to a finishing still 12 wherein they are redistilled to recover overhead through line 13 the desired product. Bottoms are recovered from the distillation zone 12 through line 15.

In the foregoing description there is indicated generally the principal steps in the synthesis of alcohols according to the "oxo" process. Only the main steps of the process have been indicated. In the interest of efficient operation and in order to control the process accessory apparatus such as pumps, compressors, valves, flow meters, etc. (not shown) are included in the plant equipment.

As previously indicated the present improvements pertain to the method of preventing the formation of high boiling material or materials which form during the distillation of the alcohols as previously stated. To the accomplishment of this result the foregoing conventional method is modified by withdrawing the crude alcohol product from the hydrogenator 7 through lines 9 and 9a and discharging it into a washing zone 16 wherein it is treated with an aqueous solution of an alkali metal bisulfite such as sodium bisulfite, whereupon undesired product, probably unconverted aldehyde, is formed into a product which is soluble in the aqueous medium and passes into said medium, thus freeing the alcohol product from this undesired material. As indicated in the drawing the bisulfite solution may be charged to the top of the washer through line 17. For best results the washer is provided with a driven agitator 18 which serves to cause thorough mixing of the aqueous solution and the crude alcohol product. A mixture of aqueous solution and crude alcohol is withdrawn from the washer 16 through line 19 and discharged into a settling zone 20 wherein it is permitted to remain quiescent until it forms two liquid phases, namely, an upper alcohol layer A and a lower water layer W. The alcohol layer may be withdrawn from line 21 and charged to distillation zone 10 and the purification carried out thereafter in the manner previously indicated.

In order to show the utility of the present invention the following data are set forth:

A sample of crude alcohols was prepared from a $C_7$ olefin fraction (obtained by fractional distillation of a polymer prepared from $C_3$–$C_4$ olefins) by (1) reaction of the olefin, hydrogen and carbon monoxide at 0.6 v./v./hr., 350° F., and 2700 p. s. i. g. pressure in the presence of 1% cobalt naphthenate catalyst, based on liquid olefin feed, and, (2) by hydrogenation of the crude product from (1) at a liquid feed rate of 0.5 v./v./hr. and 450° F. at 2700 p. s. i. g. pressure over a nickel sulfide-tungsten sulfide catalyst. The crude hydrogenated product in one case had a hydroxyl number of 248 and a carbonyl number of 50. This product (which had not been extracted with aqueous bisulfite solution) was distilled at atmospheric pressure, taking an alcohol fraction boiling over the range 340–370° F. This alcohol fraction when subjected to redistillation by the A. S. T. M. procedure had the distillation characteristics indicated in column I of the following table. Another portion of crude hydrogenated product prepared in the same manner but having a hydroxyl number of 260 and a carbonyl number of 34 was subjected to extraction with aqueous sodium bisulfite solution. After a single extraction with an equal volume of bisulfite solution of 5 wt. percent concentration, the crude, washed hydrogenated product was distilled at atmospheric pressure taking an alcohol fraction boiling over the range of 340–370° F. Other portions of the crude hydrogenated product were likewise extracted with 10% and 20% by weight solutions of sodium bisulfite in water and distilled to obtain a corresponding alcohol fraction. These alcohol fractions were then redistilled according to the A. S. T. M. procedure as indicated in columns II, III, and IV of the following table.

| Column | I | II | III | IV |
| --- | --- | --- | --- | --- |
| Crude Hydrogenated Product: | | | | |
| Hydroxyl Number | 248 | 260 | 260 | 260 |
| Carbonyl Number | 50 | 34 | 34 | 34 |
| Treatment before Distillation | None | (1) | (2) | (3) |
| Treated Crude Hydrogenated Product: | | | | |
| Hydroxyl Number | | 264 | 262 | 260 |
| Carbonyl Number | | 10 | 6 | 5 |
| Carbonyl Removal, Percent | | 71 | 82 | 85 |
| A. S. T. M. Distillation of Alcohols Previously Distilled at 340–370° F.: | | | | |
| Initial, ° F | 295 | 322 | 315 | 335 |
| 5% at ° F | 346 | 350 | 348 | 357 |
| 10% at ° F | 354 | 354 | 353 | 358 |
| 20% at ° F | 358 | 356 | 355 | 360 |
| 30% at ° F | 359 | 357 | 356 | 362 |
| 40% at ° F | 360 | 358 | 357 | 362 |
| 50% at ° F | 360 | 358 | 357 | 362 |
| 60% at ° F | 360 | 359 | 358 | 363 |
| 70% at ° F | 362 | 359 | 358 | 364 |
| 80% at ° F | 364 | 360 | 359 | 364 |
| 90% at ° F | 374 | 361 | 361 | 366 |
| 95% at ° F | 420 | 364 | 364 | 368 |
| Final, ° F | 512 | 391 | 379 | 382 |
| Recovery, Percent | 99.0 | 99.0 | 99.0 | 99.0 |
| Residue, Percent | 1.0 | 0.5 | 0.5 | |

1 Wash with 5% bisulfite solution.
2 Wash with 10% bisulfite solution.
3 Wash with 20% bisulfite solution.

The A. S. T. M. distillation data show that a high-boiling material is present in the alcohol fraction (340–370° F.) obtained from untreated crude hydrogenated product but that the formation of the high-boiling material in the alcohols is largely prevented by treating the crude hydrogenated product with aqueous bisulfite solution of suitable concentration. Portions of these high boiling materials were recovered and, after hydrolysis, were found to yield hydroxyl and carbonyl compounds in the $C_8$ molecular weight range.

The foregoing bisulfite treatments were made at room temperature (approximately 80° F.), although temperatures of 60°–212° F. may be employed. An extraction of a different crude hydrogenated product at 120–126° F. with 12% aqueous bisulfite solution reduced the carbonyl number from 40 to 11. This represents a carbonyl removal of 73%.

The hydrogenated product may be subjected to several extractions with bisulfite solution instead of to a single extraction. Data given below are illustrative of this type of operation.

The hydrogenated product from the alcohol synthesis using a $C_7$ olefin fraction was subjected to three extractions with a 4% aqueous bisulfite solution at room temperature (approximately 80° F.). The results from these extractions are compared below with results from a single extraction with 12% aqueous bisulfite. The carbonyl number of the starting material was 40.

| Extraction No. | Material Extracted | Aq. NaHSO₃ Conc. Wt. Percent | Vol. NaHSO₃/Vol. of Product | CO No. of Product | Percent CO Removal |
| --- | --- | --- | --- | --- | --- |
| I | 600 ml. of hydrogenated product | 4 | 1:1 | 17 | 58 |
| II | 375 ml. of extracted product from I | 4 | 1:1 | 12 | 70 |
| III | 200 ml. of extracted product from II | 4 | 1:1 | 14 | 65 |
| IV | 200 ml. of hydrogenated product | 12 | 1:1 | 8 | 80 |

Because of the limits of the accuracy of the analytical determinations of carbonyl number, the carbonyl numbers of 12 and 14 from extractions II and III are considered checks.

Although multiple extraction with dilute solutions of bisulfite are not as efficient as a single extraction with a more concentrated solution, it is apparent that carbonyl removal may be accomplished by this type of operation. Concentrations of 2–6 weight percent of bisulfite may be used for multiple extraction.

As indicated above one of the advantages of the present invention is that not only are the alcohols purified from contaminating by-products which impair their value as regards stability, particularly when esterifying, but there is the additional fact that the compound which is formed as a result of the bisulfite treatment is soluble in the aqueous bisulfite solution. A great many aldehydes and ketones combine with bisulfite solution to form crystalline compounds or at least compounds which are not soluble in water and which therefore require a filtering step to separate them from the liquid medium. The process described according to the present invention as applied to the product of iso-octyl alcohol results in the formation of a bisulfite product which is water soluble, passes into the water phase during the washing step and makes it possible therefore to separate the purified alcohol by decantation.

The curve shown in Fig. II illustrates the necessity of close control of aqueous bisulfite concentration in order to remove residual carbonyl compounds by washing the hydrogenated products of the alcohol synthesis reaction. These data were obtained by washing several samples of hydrogenated product (having carbonyl numbers of 30–50) with equal volumes of various concentrations of aqueous sodium bisulfite.

As the concentration of bisulfite is increased from 5% to 10–12% the alcohol (organic) layer undergoes a decrease in volume as a result of removal of carbonyl compounds. As the concentration is increased beyond 12%, however, the phase relationships become such that the two layers become miscible resulting in an actual loss of alcohol. The entire mass may assume a gelatinous consistency rendering separation very difficult; while separation may be accomplished by dilution with water (which effectively reduces the bisulfite concentration below the critical value), the volumes required may be excessive.

It is more feasible, therefore, to operate within a narrow range of bisulfite concentrations. Since there are indications that the effectiveness of carbonyl removal increases with increased aqueous concentrations of bisulfite, it is desirable to operate close to but not exceeding the critical value. According to the data presented a concentration of 10% of bisulfite in the aqueous layer should be satisfactory.

Referring again to Fig. I the water soluble octyl aldehyde bisulfite addition product may be regenerated to form the aldehyde which aldehyde may be recharged to the hydrogenation zone 7. To the accomplishment of this improvement the aqueous layer is withdrawn from the settler 20 through line 22 and treated in zone 23 by adding thereto an alkali metal carbonate solution such as sodium carbonate or dilute mineral acid through line 24. This regenerator 23 is preferably provided with a driven stirring device 25. The mixture is withdrawn from regenerator 23 through line 26 and delivered to a quiescent settling zone 27 wherein it is permitted to remain until stratified to two liquid layers, namely an upper aldehyde layer A and the lower water layer W. From the zone 27 the upper layer may be withdrawn through line 28 and delivered to line 6 and thereafter into hydrogenator 7.

To review briefly, the present invention relates to improvements in the manufacture of alcohols, particularly the higher alcohols, such as iso-octyl alcohol, by the so-called "oxo" process wherein an olefin, hydrogen and carbon monoxide are caused to react at elevated temperatures and very high pressures in the presence of a catalyst to form first an aldehyde containing one more carbon atom than the olefin, and second, reducing the aldehyde to corresponding alcohol. The raw alcohol product thus formed has been found to contain ingredients or constituents which during distillation, form other high boiling constituents with a consequent loss of desired products. Also the presence of certain constituents appears to render the desired alcohol unstable, particularly as regards color. In other words, the alcohol form when esterified with say phthalic anhydride yields an ester which has been found to darken very markedly.

The gist of the present invention appertains to the correction of the foregoing defects in the prior practice by subjecting the raw alcohol to a bisulfite wash. Thus, an aqueous solution of sodium bisulfite removes upon mixture with the raw alcohol, carbonyl components, which pass into the aqueous medium. The mixture of bisulfite solution and alcohol forms, on standing, two liquid phases which can be easily separated. It is important to note that the sodium bisulfite wash does not cause the formation of a precipitate and thus filtering of large volumes of liquid is obviated. However, solutions of restricted and critical concentration of the bisulfite must be employed for if the aqueous solution is saturated with respect to the alkali metal bisulfite, the alcohol layer and the bisulfite layer tend to coalesce and gelatinize, rendering separation of the alcohol difficult and costly. If the concentration is below about 5% by weight, the solution is not strong enough to be effective in removing carbonyl compounds in a single wash, although several washes will be effective.

From the foregoing it can be seen that the present invention provides a procedure for improving the yields of desired alcohols from a synthesis involving a reaction between hydrogen, carbon monoxide and an olefin in a first stage followed by a reduction with hydrogen in a second stage, the improvement involving subjecting the crude alcohol to a bisulfite wash prior to distillation. The undesired carbonyls are removed from the raw alcohol without forming a precipitate and thus filtering of large volumes of liquid is avoided for the carbonyls pass into the aqueous phase and may be removed by decantation or drawing off the water phase.

It is obvious that many modifications of the invention may be made by those who are familiar with this art without departing from the spirit thereof.

What is claimed is:
1. In the synthesis of octyl alcohols in a two-stage operation consisting of a first stage in which hydrogen, carbon monoxide and a heptene olefin are contacted in the presence of a cobalt containing catalyst forming a product predominantly aldehyde and of a second stage in which the said aldehyde is reduced with hydrogen to form the corresponding alcohol and which is further characterized in that the crude alcohol is subjected to distillation in order to purify the same, the improvement which consists in extracting the crude alcohol product at least once prior to distillation with an aqueous solution of an alkali metal bisulfite containing from 5–12% by weight of bisulfite in an extraction zone thereafter permitting the washing mixture to stratify into a lower aqueous layer containing undesired organic material and an upper alcohol layer, the former containing a solution of undesired constituents of the original raw alcohol product, separating the thus purified alcohol product from the aqueous layer and subjecting the said alcohol product to distillation to form a purified and stable product.

2. Method set forth in claim 1 in which the aqueous layer after separation from the alcohol layer is treated with an alkali metal carbonate for the purpose of converting the undesired material to an aldehyde material and thereafter returning such aldehyde material to the said hydrogenation step.

3. The method of claim 1 in which the extraction is carried out in several successive steps employing a bisulfite solution having a concentration of 2–6 weight per cent.

4. The method of claim 1 in which a temperature of 60–212° F. is maintained in the extraction zone.

5. In the synthesis of iso-octyl alcohol in two-stage operation consisting of a first stage in which carbon monoxide and an olefin comprising normal heptene and hydrogen are contacted in the presence of a cobalt-containing catalyst at elevated temperatures and pressures in a reaction zone for a sufficient period of time to form an aldehyde containing 8 carbon atoms, in which the product is withdrawn from the reaction zone and charged to a hydrogenation zone where it is contacted at elevated temperatures and pressures with a hydrogenation catalyst and added hydrogen for a sufficient period of time to reduce the major portion of the said aldehyde product to the corresponding alcohol, the improvement consisting in withdrawing the crude alcohol product from the last named zone and subjecting it to at least one extraction with an aqueous solution of an alkali metal bisulfite containing from 5–12% by weight of said bisulfite in an extraction zone, withdrawing the mixture of aqueous bisulfite solution and crude alcohol product, charging them into a quiescent settling zone wherein the mixture is permitted to stratify into an upper crude alcohol layer and a lower aqueous layer and further wherein oxygenated compounds other than alcohol pass from the alcohol layer into the aqueous layer, separating the alcohol layer from the aqueous layer and subjecting the thus separated alcohol to distillation to recover iso-octyl alcohol.

6. The method of claim 5 in which the aqueous layer is treated with an alkali metal carbonate to form aldehyde material and further in which the said aldehyde material thus formed is charged to the hydrogenation zone.

7. The method set forth in claim 5 in which cobalt contained in the aldehyde product is removed prior to charging the said aldehyde product to the hydrogenation step.

8. The method of claim 5 in which the extraction is carried out in several successive steps employing a sodium bisulfite solution having a concentration of 2–6 weight per cent.

9. The method of claim 5 in which a temperature of 60–212° F. is maintained in the extraction zone.

References Cited in the file of this patent

UNITED STATES PATENTS

| Number | Name | Date |
|---|---|---|
| 432,198 | Guignard | July 15, 1890 |
| 1,704,751 | Luther et al. | Mar. 12, 1929 |
| 2,327,066 | Roelen | Aug. 17, 1943 |
| 2,437,600 | Gresham et al. | Mar. 9, 1948 |
| 2,457,257 | Michael et al. | Dec. 28, 1948 |

OTHER REFERENCES

Fieser and Fieser, "Organic Chemistry," pages 206 and 207. Publ. by Heath & Co., Boston, 1944.

Fiat Final Report No. 1000, "The Oxo Process," PB–81383, Dec. 26, 1947, pages 5, 6, 7, 9, 17 and 35.

U. S. Naval Technical Mission in Europe, "The Synthesis of Hydrocarbons and Chemicals from CO and $H_2$," Technical Report No. 248–45 (Sept. 1945), pages 115–118 and 122.